D. PENTEADO, Jr.
MONOCYCLE.
APPLICATION FILED SEPT. 9, 1908.
919,070.
Patented Apr. 20, 1909.
2 SHEETS—SHEET 1.
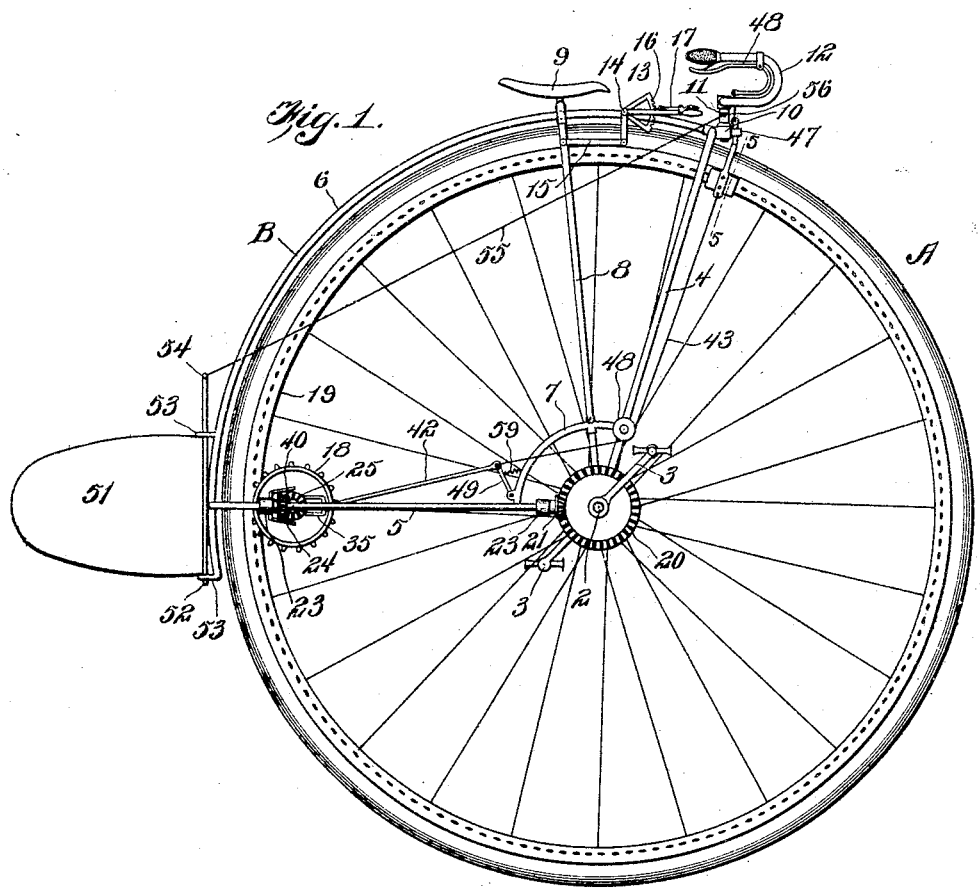
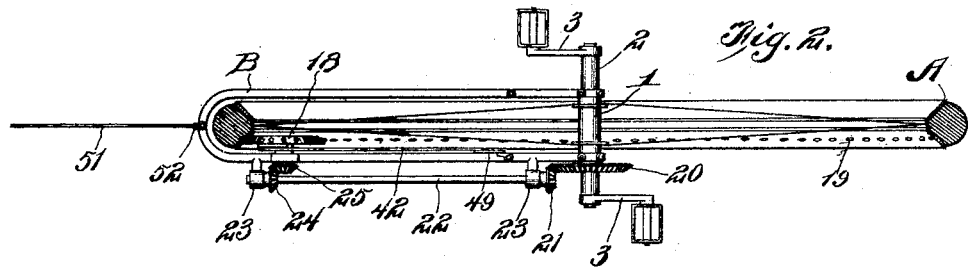
Witnesses
Louis R. Heinrichs
C. Bradway.
Inventor
Diogo Penteado, Jr.
By Victor J. Evans
Attorney

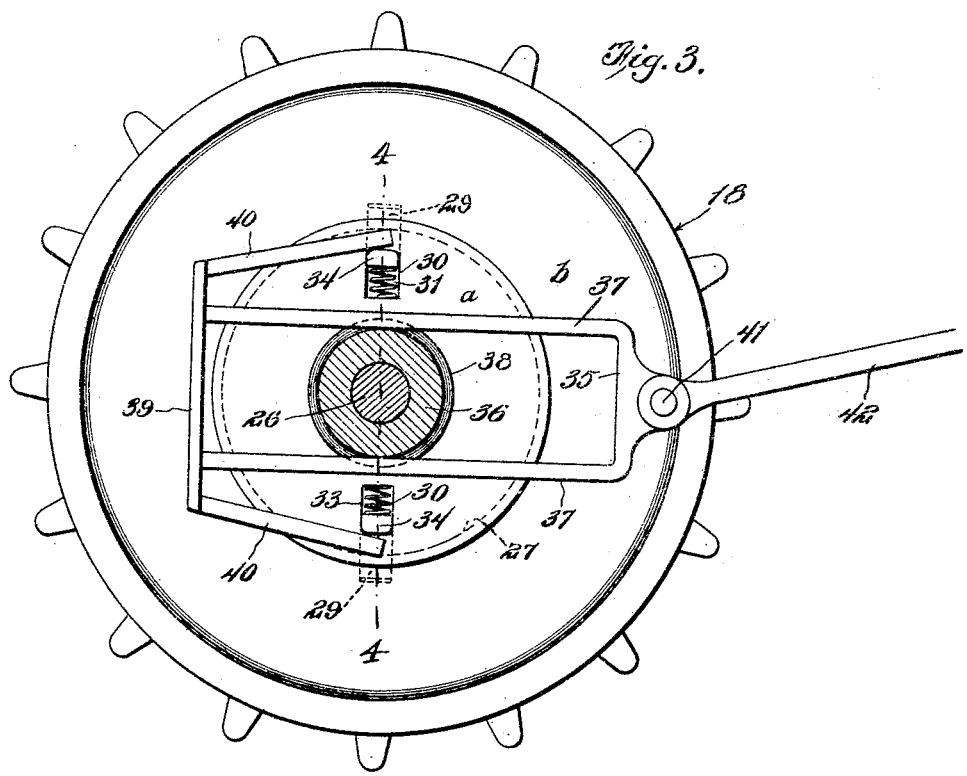
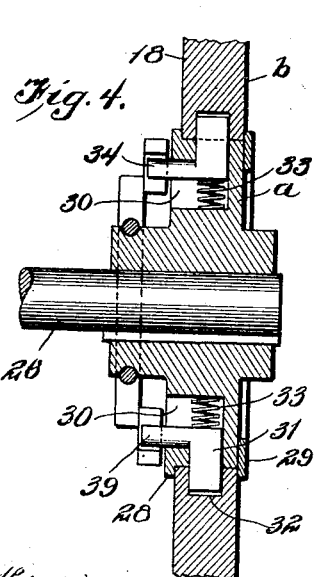
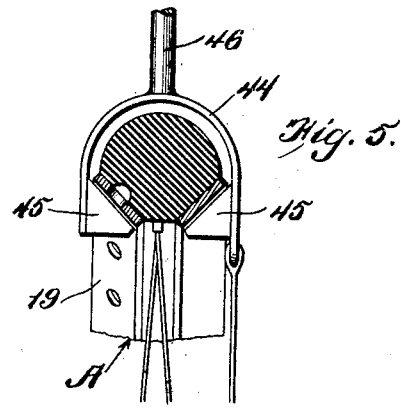

UNITED STATES PATENT OFFICE.

DIOGO PENTEADO, JR., OF WASHINGTON, DISTRICT OF COLUMBIA.

MONOCYCLE.

No. 919,070.  Specification of Letters Patent.  Patented April 20, 1909.

Application filed September 9, 1908. Serial No. 452,221.

*To all whom it may concern:*

Be it known that I, DIOGO PENTEADO, Jr., a citizen of the Republic of Brazil, residing at Washington, in the District of Columbia, have invented new and useful Improvements in Monocycles, of which the following is a specification.

This invention relates to that class of vehicles known as monocycles, and relates more particularly to improvements in means for maintaining the saddle-carrying frame stable under varying running conditions so that the monocycle can be more readily controlled and guided.

The invention has for one of its objects to improve and simplify the construction and operation of apparatus of this character so as to be comparatively easy and inexpensive to manufacture, and readily controlled.

Another object of the invention is the improvement in the driving mechanism with which the gear for driving the wheel can be unclutched to run free when the saddle-carrying frame tends to drop by the slipping of the traction wheel so that the operator can set a brake to grip the traction wheel to restore the saddle-carrying frame to normal position, the brake being released when the frame is thus righted and the gear again clutched to the pedal mechanism for driving the traction wheel of the machine.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of the monocycle. Fig. 2 is a horizontal central section thereof. Fig. 3 is an enlarged detail view of the clutch device. Fig. 4 is a section on line 4—4, Fig. 3. Fig. 5 is a detail sectional view on line 5—5, Fig. 1.

Similar reference characters are employed to designate corresponding parts throughout the views.

Referring to the drawings, A designates the traction wheel of the monocycle which may be of any desirable size and construction, and in the hub 1 thereof is an axle 2 which is provided with pedals 3 attached to its extremities.

Mounted on the axle is a frame designated generally by B which comprises an approximately vertical front fork 4 that spans the wheel A and an approximately horizontal fork 5 extending rearwardly from the axle and rigidly connected with the fork 4 by a back bar 6 arranged concentrically over the periphery of the wheel A. The inner ends of the forks 4 and 5 are braced by arcuate rods 7 disposed at opposite sides of the wheel A and connecting corresponding members of the forks together. Attached to the rods 7 is a saddle-carrying fork 8 that spans the wheel A at a point behind the front fork 4, and on the upper end of the fork 8, which can be tilted forwardly or backwardly according to the changes in inclination of the roadway, is a saddle 9.

On the upper end of the front fork 4 is a bearing 10 in which is mounted a steering post 11 equipped with steering handles 12. Disposed behind the steering handles is the device for changing the position of the fork 8 with respect to the frame B, and this device comprises a bell crank lever 13 fulcrumed on the back bar 6 at 14 and connected by a link 15 with the fork 8. One arm of the lever constitutes an operating handle and moves over a toothed sector 16 rigidly mounted on the back bar 6 and with which a latch 17 on the lever is adapted to engage for holding the latter in locked position. By means of this device, the center of gravity can be shifted in going up or down hill and thus insure stability.

For driving the wheel A by the pedals 3, a toothed wheel or gear 18 is mounted on the frame B with its teeth in mesh with the apertured felly 19 of the wheel A, and the gear 18 is rotated by the pedals by any suitable mechanism. In the construction shown, the axle 2 is provided with a miter gear 20 that meshes with a miter gear 21 on a horizontally-extending shaft 22 that rotates in bearings 23 on the fork 5, and on the rear end of the shaft 22 is a miter pinion 24 that meshes with a miter pinion 25 on the axle 26 of the toothed wheel 18. The wheel 18 is made of two concentric sections $a$ and $b$ which are normally clutched together so that the axle 26 will rotate the section $b$ with the section $a$ for driving the traction wheel A. The section $b$ has a central opening 27 in which the section $a$ has a working fit and the sections are held against relative lateral displacement by a peripheral flange 28 on the section $a$ and a ring 29 removably secured to said section, the flange and ring engaging opposite faces of the section b to hold the latter in place. The section a is provided with radial recesses 30 that open in the side face thereof and in these recesses are spring-pressed dogs 31 that are adapted to engage in recesses 32 in the internal surface of the section b so as to lock the two sections together. The clutching dogs 31 which are pressed outwardly by springs 33, are provided with laterally-extending fingers 34 that project out of the openings of the recesses 30 to be engaged by a releasing device which can be operated from the steering handles. This device consists of a yoke 35 which is slidably mounted on the hub 36 of the section a, the parallel members 37 of the yoke being engaged in a peripheral groove 38 of the hub so as to be prevented from lateral movement and on the member 37 is a vertical bar 39 that carries forwardly-inclined dog-releasing members 40 that engage, respectively, over and under the fingers 34 of the dogs. As the members 40 diverge forwardly, a forward pull on the yoke will retract the dogs 31 against the tension of the springs 33 to thereby permit the outer section b of the toothed wheel 18 to turn freely. The front of the yoke is connected at 41 with a link 42 that is attached to a flexible element 43, such as a cord or wire, and which element is, in turn, connected with a wheel-clutching or brake device arranged at the handle bars of the machine. This brake device consists of a yoke 44, Figs. 1 and 5, which spans the tire of the wheel A in front of the fork 4, and is provided with shoes 45 that are adapted to be brought into engagement with the felly of the wheel. The yoke 44 has an upwardly-extending stem 46 slidably mounted in a bearing 47 on the head 10 and this stem is connected with the operating lever 48 fulcrumed on one of the handle bars 12. The flexible element 43 that is connected with the brake yoke 44 passes over a guide pulley 48 arranged adjacent the bottom of the fork 4. Connected with the front end of the link 42 and with one of the arcuate bars 7 of the frame B is a link 49 that is pressed rearwardly by a spring 59.

By means of the clutch and brake devices just described, the frame B that supports the rider can be righted in case the frame tends to drop. In order to do this, the rider merely presses the operating lever 48, which he holds in one hand while gripping the handle bars, and this movement of the lever frictionally grips the shoes 45 to the wheel A and simultaneously unclutches the outer section b from the inner section a of the gear wheel 18 so that the turning of the wheel A will lift the frame B and rider to normal position when the brake lever 48 is released for removing the shoes 45 from the wheel A and for simultaneously closing the clutch of the wheel 18.

To steer the machine, a rudder 51 is mounted on the frame B at a point behind the traction wheel A by means of a vertical shaft 52 journaled in bearings 53 on the lower end of the back bar 6. The upper end of the shaft 52 is provided with a cross-bar 54 to the ends of which are connected cords 55 that are attached to arms 56 extending from opposite sides of the steering post 11 so that by turning the steering handles in one direction or the other, the rudder 51 will be turned to an angle to the line of travel to thereby cause the machine to be guided, the rudder acting on the air to change the position or direction of travel of the machine.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. In a monocycle, the combination of a traction wheel, a pedal mechanism for driving the wheel and including a rotatable element operatively connected with the wheel, a clutch device for throwing the element out of operation, a rider carrying frame mounted on the axle of the wheel, means for gripping the frame to the wheel, and a controlling mechanism for simultaneously actuating the clutch device and said gripping means.

2. In a monocycle, the combination of a traction wheel, an axle therefor, pedals on the axle, a seat-carrying frame supported by the axle, a driving element operatively connected with the wheel for rotating the same, a power-transmitting mechanism between the axle and element, a clutch for operatively connecting the element with the mechanism, a device mounted on the frame for gripping the moving traction wheel for restoring the frame to normal position in the event of its dropping, and controlling means for the said device and clutch.

3. In a monocycle, the combination of a traction wheel, an axle therefor, pedals on the axle, a saddle-carrying frame mounted on the axle, a toothed element on the frame meshing with the periphery of the wheel for rotating the same, said element comprising two parts, dogs for clutching the parts together, power-transmitting means between the axle and the element, a device for releasing the dogs, a device on the frame for frictionally connecting the latter with the traction wheel, a connection between the two devices for operating the same simultaneously, and a controlling lever for the devices.

4. In a monocycle, the combination of a traction wheel, a pedal mechanism for rotating the wheel, a device for operatively connecting the mechanism with the wheel, a steering device, means for actuating the latter, a saddle-carrying frame, means for righting the frame by the movement of the wheel, and a controller for actuating the device to disconnect the mechanism from the wheel and for throwing the last-mentioned means into operation.

In testimony whereof I affix my signature in presence of two witnesses.

DIOGO PENTEADO, Jr.

Witnesses:
   JOHN L. FLETCHER,
   CHATTEN BRADWAY.